(12) United States Patent
Ohkuma et al.

(10) Patent No.: US 7,768,879 B2
(45) Date of Patent: Aug. 3, 2010

(54) OPTICAL PICKUP AND OPTICAL DISK APPARATUS

(75) Inventors: Hideo Ohkuma, Tokyo (JP); Muneyuki Horiguchi, Shizuoka (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 11/788,118

(22) Filed: Apr. 19, 2007

(65) Prior Publication Data

US 2007/0253297 A1 Nov. 1, 2007

(30) Foreign Application Priority Data

Apr. 28, 2006 (JP) ............................. 2006-126595

(51) Int. Cl.
*G11B 7/00* (2006.01)
(52) U.S. Cl. ............... 369/44.15; 369/44.14; 369/44.11
(58) Field of Classification Search .............. 369/44.15, 369/44.14, 44.11
See application file for complete search history.

(56) References Cited

U.S. PATENT DOCUMENTS 5,905,255 A * 5/1999 Wakabayashi et al. ... 250/201.5
6,744,722 B2 * 6/2004 Choi .......................... 720/683
2006/0181970 A1 * 8/2006 Miyagi ..................... 369/44.14

FOREIGN PATENT DOCUMENTS

JP 2002-245646 A 8/2002

* cited by examiner

*Primary Examiner*—Daniell L Negrón
*Assistant Examiner*—Nicholas Lee
(74) *Attorney, Agent, or Firm*—Wolf, Greenfield & Sacks, P.C.

(57) ABSTRACT

An optical pickup includes a lens holder holding an objective lens for converging a light beam on a signal recording layer of an optical disk; elastic support members supporting the lens holder such that the lens holder can freely move in three driving directions, i.e., a tracking direction, a focusing direction, and a tilting direction; a pair of coil units attached to two sides of the lens holder, the two sides being spaced in a tangential direction orthogonal to the focusing direction and tracking direction; and a pair of magnets arranged to face the corresponding coil units. Each coil unit includes a tracking coil, a focusing coil, and a tilting coil for driving the lens holder in the three driving directions. The focusing coil and the tilting coil are formed by winding a focusing conductor of the focusing coil and a tilting conductor of the tilting coil together in parallel.

6 Claims, 8 Drawing Sheets

OPTICAL PICKUP AND OPTICAL DISK APPARATUS

CROSS REFERENCES TO RELATED APPLICATIONS

The present invention contains subject matter related to Japanese Patent Application JP 2006-126595 filed in the Japanese Patent Office on Apr. 28, 2006, the entire contents of which are incorporated herein by reference.

BACKGROUND OF THE INVENTION

1. Field of the Invention

The present invention relates to optical disk apparatuses and optical pickups and is suitable for being applied to optical disk apparatuses of various types.

2. Description of the Related Art

An optical disk apparatus is typically configured to irradiate an optical disk with a laser beam from an optical pickup, thereby recording and reproducing information.

An example of such an optical pickup is disclosed in Japanese Unexamined Patent Application Publication No. 2002-245646. In this optical pickup, three types of coils for tracking, focusing, and tilting and magnets corresponding to these three types of coils are arranged around a lens holder holding an objective lens so as to form an actuator, thereby driving the objective lens in three directions, that is, a tracking direction which is a radial direction of an optical disk, a focusing direction in which the objective lens is moved closer to or away from the optical disk, and a tilting direction in which the optical axis of a laser beam is tilted.

SUMMARY OF THE INVENTION

In the optical pickup with the above-described configuration, it is necessary that each magnet be divided into at least four magnetized portions, as the magnetic polarity of the magnet is reversed for each of the three coils. This results in increase in the area of neutral portions between different magnetic poles of the magnet, the neutral portions not being magnetized into either of the magnetic poles. Thus, it is difficult to increase the sensitivity of the actuator.

The present invention addresses this problem by proposing an optical pickup and optical disk apparatus with a high sensitivity actuator.

According to an embodiment of the present invention, there is provided an optical pickup including a lens holder that holds an objective lens for converging a light beam on a signal recording layer of an optical disk; elastic support members that support the lens holder such that the lens holder can freely move in three driving directions, that is, a tracking direction, a focusing direction, and a tilting direction; a pair of coil units attached to two sides of the lens holder, the two sides being spaced in a tangential direction orthogonal to the focusing direction and tracking direction; and a pair of magnets arranged to face the corresponding coil units. Each of the pair of coil units includes a tracking coil, a focusing coil, and a tilting coil for driving the lens holder in the three driving directions. The focusing coil and the tilting coil are formed by winding a focusing conductor of the focusing coil and a tilting conductor of the tilting coil together in parallel.

According to the embodiment of the present invention, two coils, that is, the focusing coil and the tilting coil can be formed in the same area and it is only necessary to reverse the magnetic polarity just once for the two coils. This reduces the number of magnetized portions and reduces the area of neutral portions. At the same time, since the two coils are horizontally longer than before, the ratio of thrust-generating parts in the two coils can be increased. Thus, an optical pickup and optical disk apparatus with a high sensitivity actuator can be realized.

DESCRIPTION OF THE PREFERRED EMBODIMENTS

An embodiment of the present invention will now be described in detail with reference to the drawings.

(1) Overall Configuration of Optical Disk Apparatus

Figure 1:
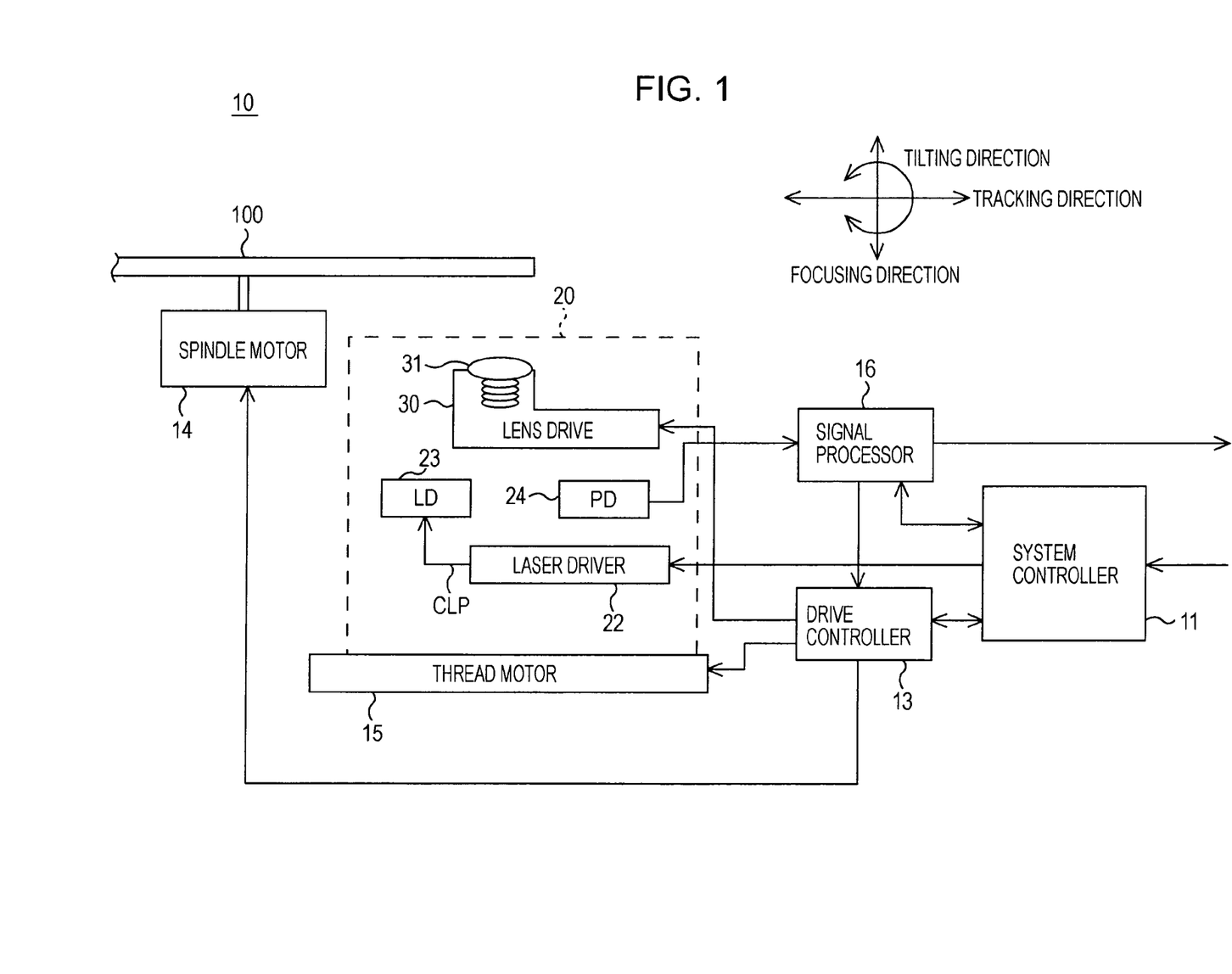
FIG. 1 is a schematic diagram illustrating an overall configuration of an optical disk apparatus.

FIG. 1 illustrates an overall configuration of an optical disk apparatus 10. The optical disk apparatus 10 is configured to reproduce and record data from and on an optical disk 100 under the control of a system controller 11.

For data reproduction, the system controller 11 transmits a data read instruction to a drive controller 13 together with address information for identifying data to be read from the optical disk 100.

In response to the data read instruction from the system controller 11, the drive controller 13 controls a spindle motor 14 to rotate the optical disk 100 at a predetermined speed. At the same time, on the basis of the data read instruction and the address information, the drive controller 13 controls a thread motor 15 to move the optical pickup 20 in a radial direction of the optical disk 100. The system controller 11 causes, via a laser driver 22 of the optical pickup 20, a laser diode (LD) 23 to emit a light beam to a track formed on an information recording layer of the optical disk 100 and corresponding to the address information. The light beam emitted from the laser diode 23 is converged by an objective lens 31 and applied to the optical disk 100.

In the optical pickup 20, a light beam applied to and reflected from the optical disk 100 is received at a photo diode (PD) 24. Then, the photo diode 24 transmits a reception light signal corresponding to the amount of the reflected light beam to a signal processor 16. On the basis of the reception light signal, the signal processor 16 generates a tracking error signal corresponding to the amount of displacement of the irradiation point of the light beam from the desired track, also generates a focusing error signal corresponding to the amount of displacement of the focus of the light beam on the information recording layer of the optical disk 100, and transmits these generated signals to the drive controller 13. At the same time, the signal processor 16 generates a reproduction RF signal on the basis of the reception light signal and transmits the reproduction RF signal to an external device (not shown).

The drive controller 13 generates a tracking drive current and a focusing drive current on the basis of the tracking error signal and the focusing error signal, also generates a tilting drive current on the basis of a tilting control signal supplied from the system controller 11, and transmits these generated currents to a lens drive 30. In response to this, the lens drive 30 drives the objective lens 31 in three directions, that is, a tracking direction which is a radial direction of the optical disk 100, a focusing direction in which the objective lens 31 is moved closer to or away from the optical disk 100, and a tilting direction in which the optical axis of the light beam is tilted, thereby allowing the light beam to be focused on the desired track of the optical disk 100.

The system controller 11 generates a laser power signal on the basis of the reproduction RF signal and transmits the laser power signal to the laser driver 22. On the basis of the laser power signal, the laser driver 22 generates a laser power control signal (CLP), with which the laser driver 22 adjusts the intensity of a light beam to be emitted from the laser diode 23 to a value suitable for data reproduction.

For data recording, the system controller 11 transmits a data write instruction to the drive controller 13 together with address information for specifying a position on the information recording layer of the optical disk 100 at which data is to be recorded.

Also, the system controller 11 transmits write data input through an external device (not shown) or the like to the drive controller 13. On the basis of the address information supplied from the system controller 11, the drive controller 13 controls the position of the optical pickup 20.

In response to this, the optical pickup 20 allows a light beam to be focused on a track formed on the information recording layer of the optical disk 100 and corresponding to the address information. The optical pickup 20 emits a light beam having an intensity adjusted, by the laser driver 22, to be suitable for data recording, thereby recording the write data on the optical disk 100.

Thus, the optical disk apparatus 10 causes the optical pickup 20 to emit a light beam focused on a desired track on the information recording layer of the optical disk 100, thereby performing data recording and reproduction.

(2) Configuration of Lens Drive

Figure 2:
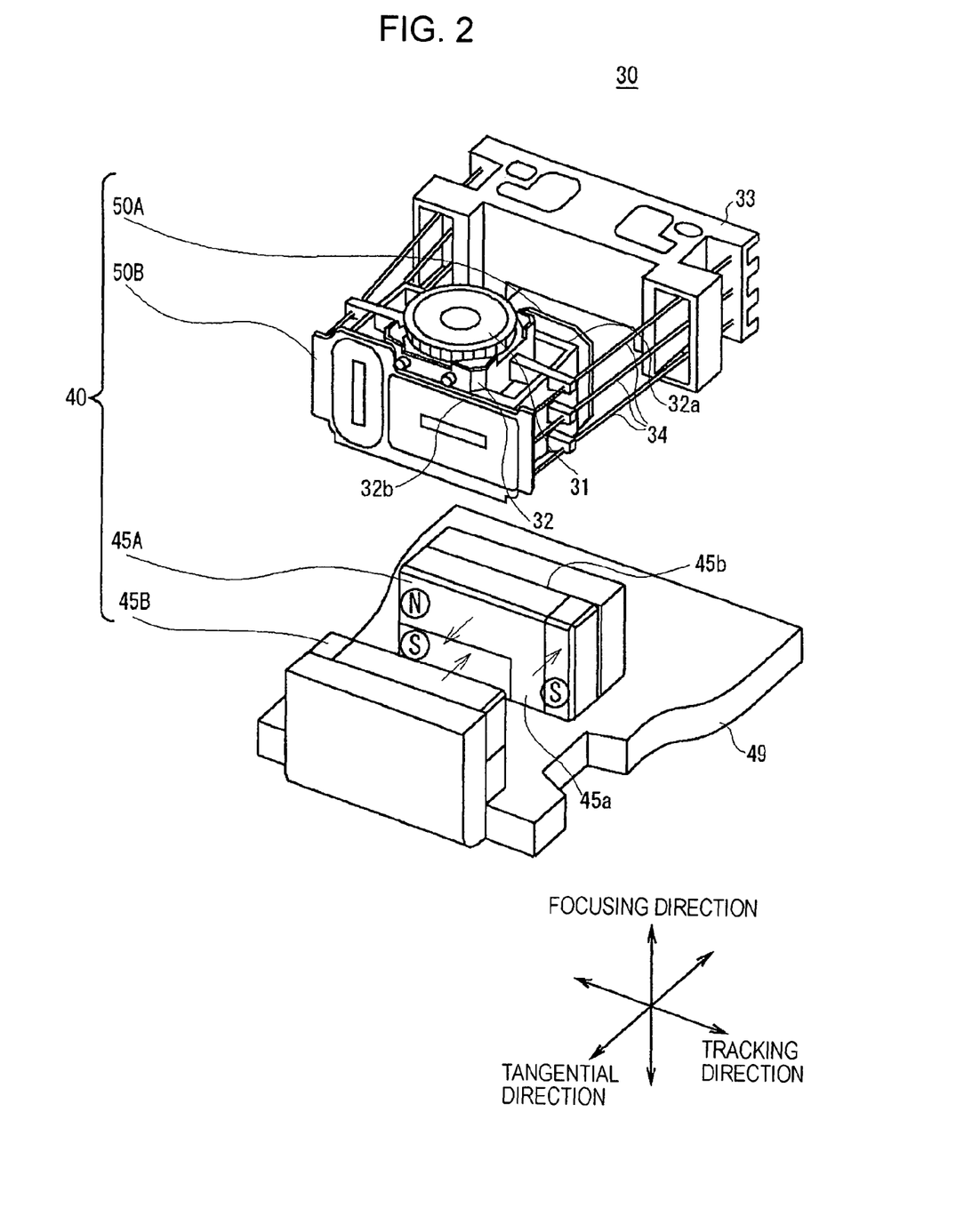
FIG. 2 is a schematic diagram illustrating a configuration of a lens drive.

FIG. 2 illustrates a configuration of the lens drive 30. A lens holder 32 provided with the objective lens 31 is elastically supported by six suspension wires 34 extended from a fixed part 33, which is to be attached to a yoke 49. At the same time, the lens holder 32 is provided with an actuator 40 therearound.

As illustrated in FIG. 2, the actuator 40 includes two coil units 50 (i.e., a first coil unit 50A and a second coil unit 50B) and two magnets 45 (i.e., a first magnet 45A and a second magnet 45B).

The coil units 50 are mounted on two sides (i.e., a first surface 32*a* and a second surface 32*b*) of the lens holder 32, the two sides being spaced in a tangential direction orthogonal to a focusing direction and tracking direction. As for the magnets 45, their respective mounting surfaces 45*b* are secured to the yoke 49.

In the actuator 40, facing surfaces 45*a* of the magnets 45 are arranged opposite each other with the coil units 50 interposed therebetween. This allows currents flowing through each coil and magnetic fields generated by the magnets 45 to produce thrust which drives the lens holder 32. Hereinafter, a description will be made on the basis of a state where the facing surface 45*a* of the first magnet 45A faces the user.

Figure 3A:
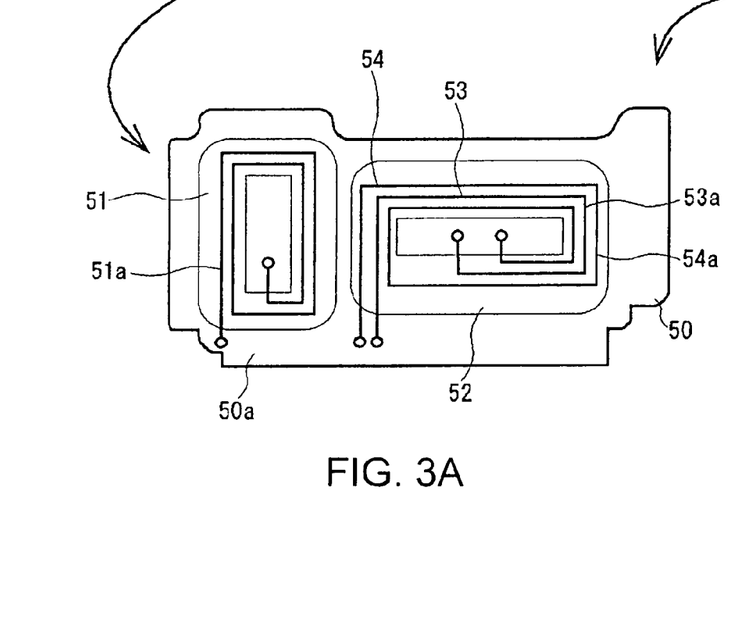
FIGS. 3A and 3B are schematic diagrams illustrating a configuration of a coil unit.
Figure 3B:
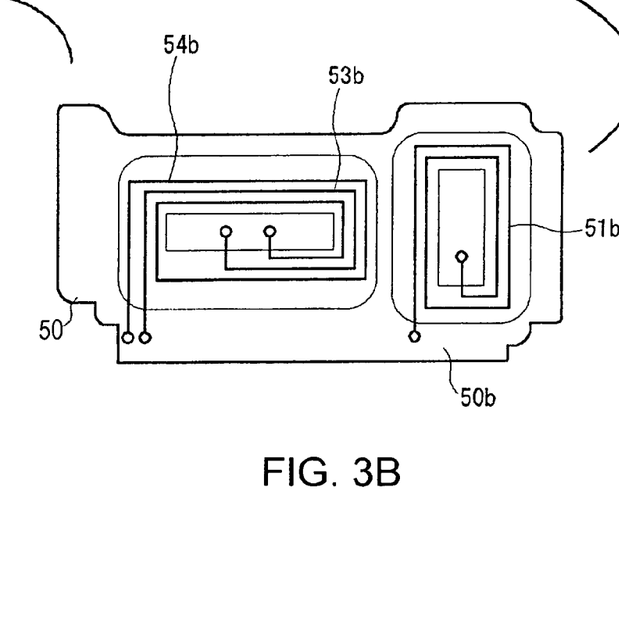

FIGS. 3A and 3B illustrate front and rear sides, respectively, of one of the two coil units 50 described above. As illustrated, the coil unit 50 includes a vertically oriented tracking (hereinafter abbreviated as "TR") coil 51 (i.e., a first TR coil 51A or second TR coil 51B illustrated in FIGS. 6 to 8) and a horizontally oriented focusing/tilting (hereinafter abbreviated as "FC/TLT") coil 52 (i.e., a first FC/TLT coil 52A or second FC/TLT coil 52B illustrated in FIGS. 6 to 8) that are in the same plane. The TR coil 51 is formed by connecting, in series, a single spiral front TR conductor 51*a* on a front surface 50*a* of the coil unit 50 to a single spiral rear TR conductor 51*b* on a rear surface 50*b* of the coil unit 50.

Figure 7:
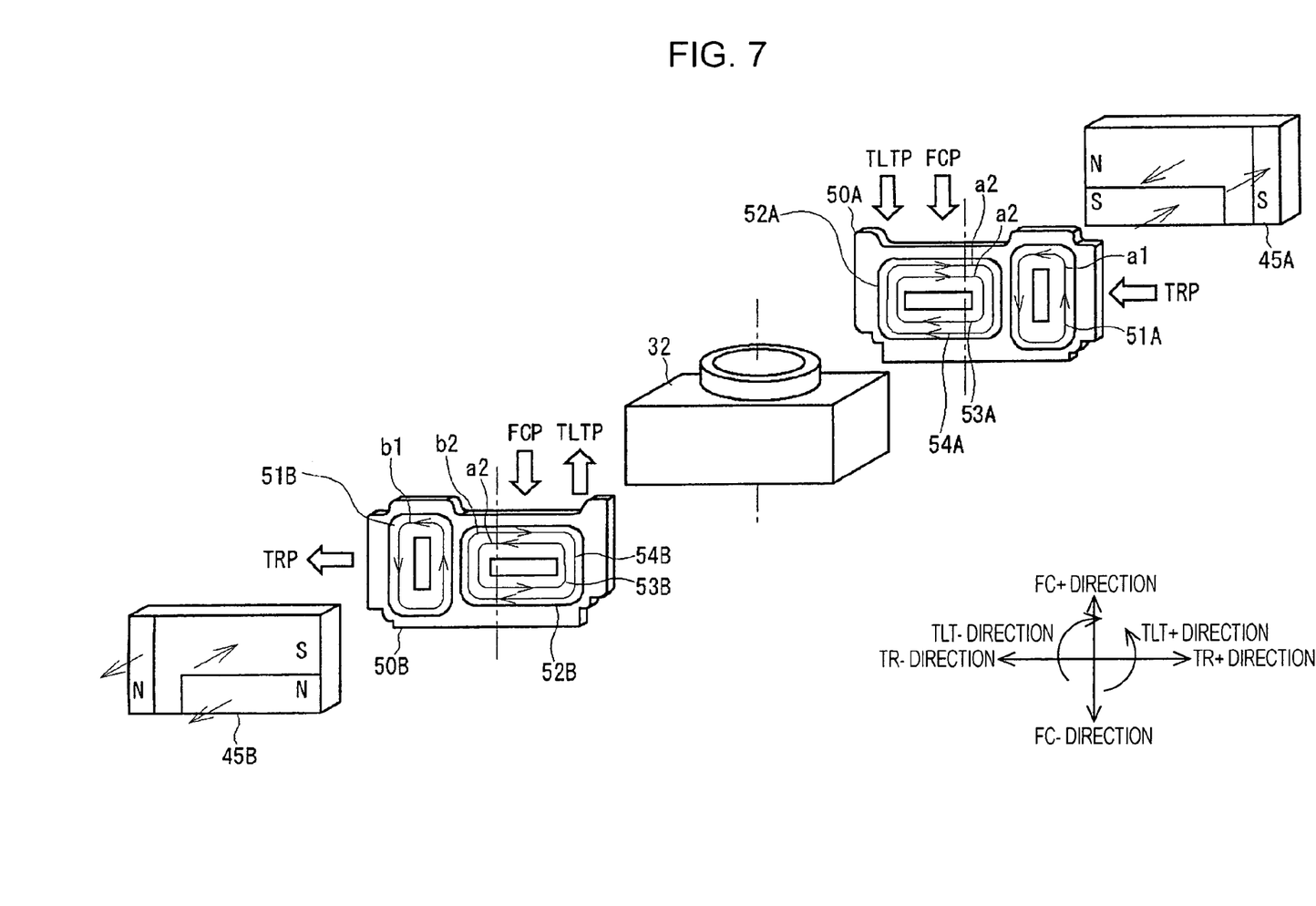
FIG. 7 is a schematic diagram illustrating an example of driving of a lens holder.
Figure 8:
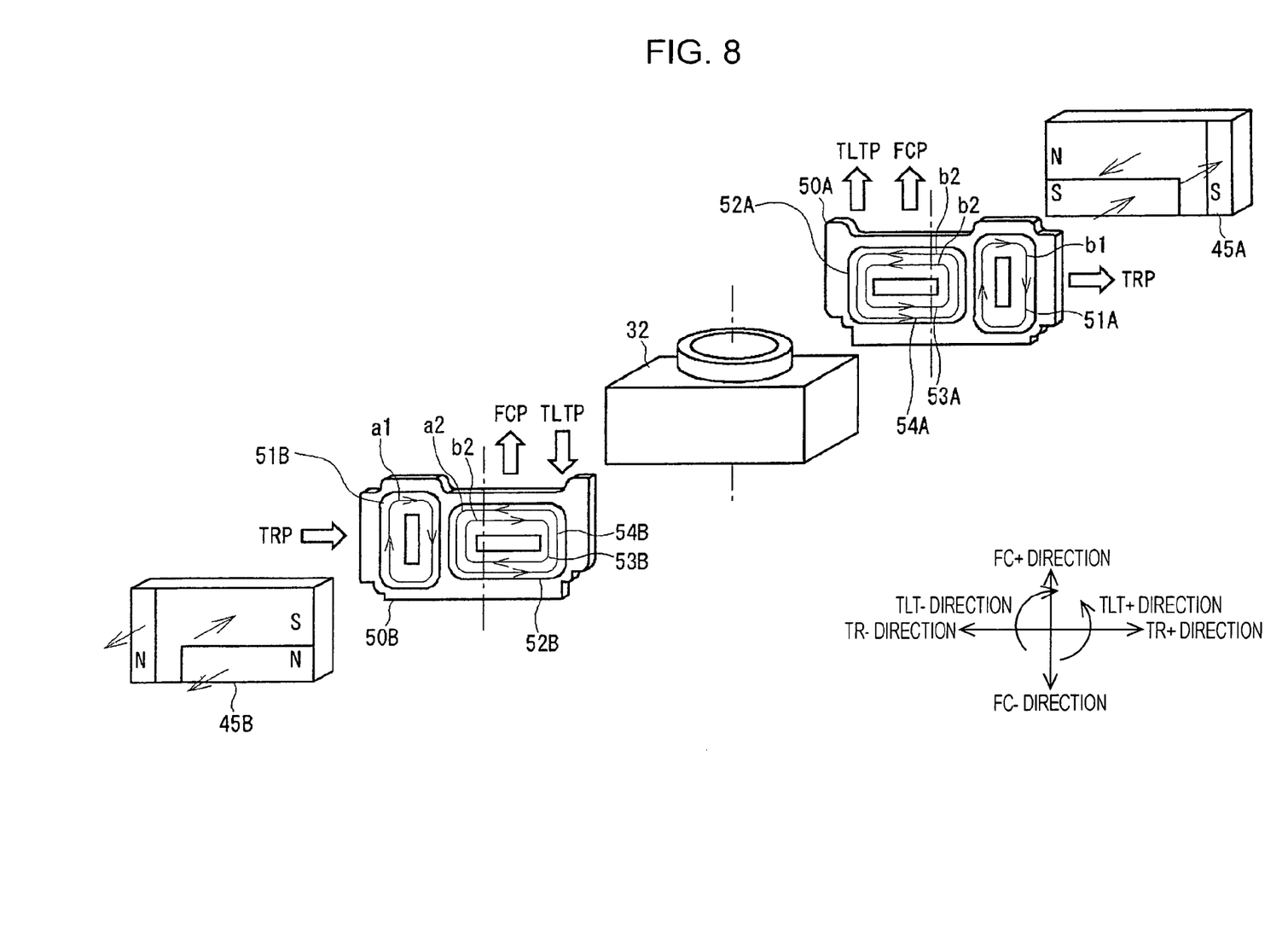
FIG. 8 is a schematic diagram illustrating another example of driving of the lens holder.

The FC/TLT coil 52 includes a focusing wiring 53 and a tilting wiring 54 in the same area. More specifically, as illustrated in FIGS. 7 and 8, the first FC/TLT coil 52A includes a first focusing wiring 53A and a first tilting wiring 54A in the same area, while the second FC/TLT coil 52B includes a second focusing wiring 53B and a second tilting wiring 54B in the same area. Referring to FIG. 3A, the focusing wiring 53 and the tilting wiring 54 are formed by concentrically winding two conductors together in parallel.

As in the case of the TR coil 51, the focusing wiring 53 is formed by connecting, in series, a spiral front FC conductor 53*a* on the front surface 50*a* of the coil unit 50 to a spiral rear FC conductor 53*b* on the rear surface 50*b* of the coil unit 50. Likewise, the tilting wiring 54 is formed by connecting, in series, a spiral front TLT conductor 54*a* on the front surface 50*a* of the coil unit 50 to a spiral rear TLT conductor 54*b* on the rear surface 50*b* of the coil unit 50.

Figure 4:
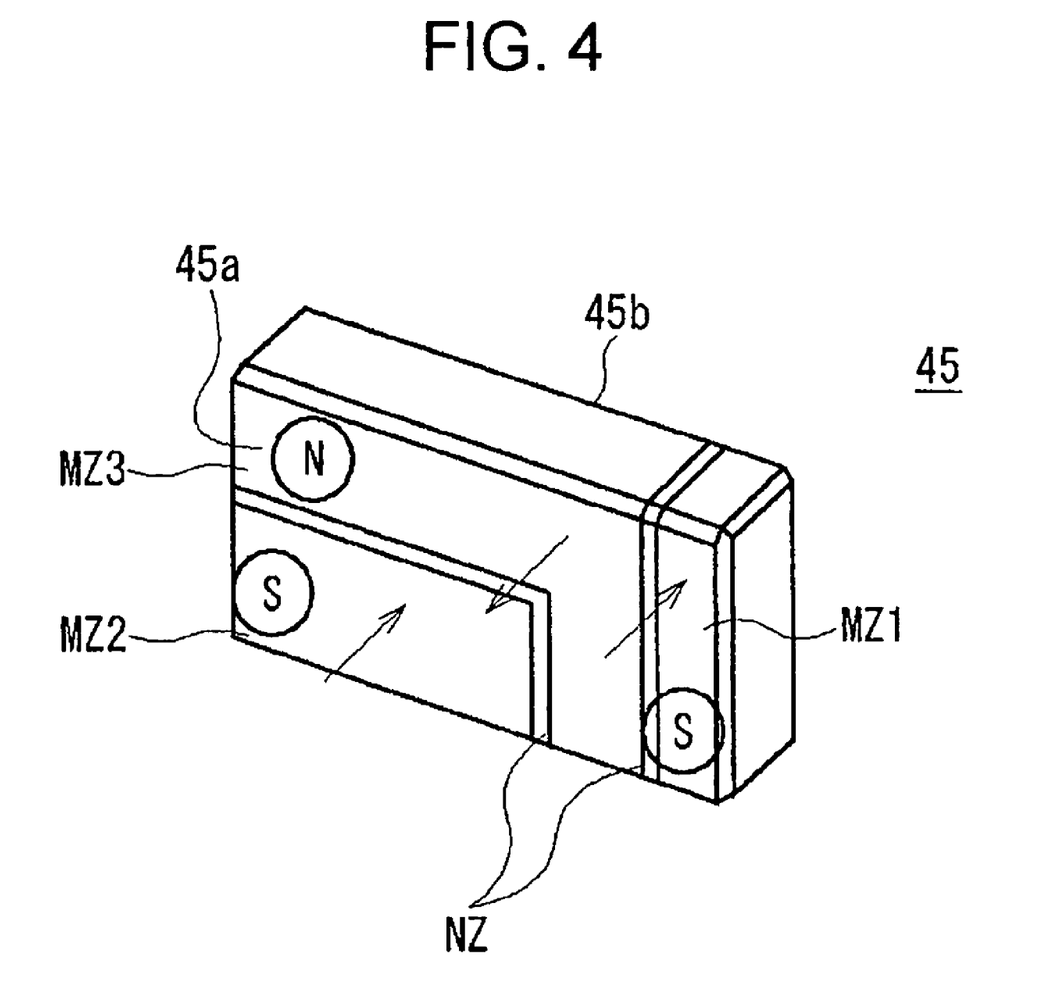
FIG. 4 is a schematic diagram illustrating a configuration of a magnet.

FIG. 4 illustrates a configuration of one of the two magnets 45 described above. As illustrated in FIG. 4, the magnet 45 having a rectangular parallelepiped shape includes a vertically oriented first portion MZ1 formed at the right end by dividing the magnet 45 in the tracking direction; a horizontally oriented second portion MZ2 formed at the lower left by dividing the magnet 45 in the focusing direction; and an L-shaped third portion MZ3 composed of one sub-portion immediately to the left of the first portion MZ1 and the other sub-portion immediately above the second portion MZ2.

The first portion MZ1 and the second portion MZ2 are magnetized such that the S-pole is formed on the facing surface 45*a* and the N-pole is formed on the mounting surface 45*b*. On the other hand, the third portion MZ3 is magnetized such that the N-pole is formed on the facing surface 45*a* and the S-pole is formed on the mounting surface 45*b*.

Figure 5:
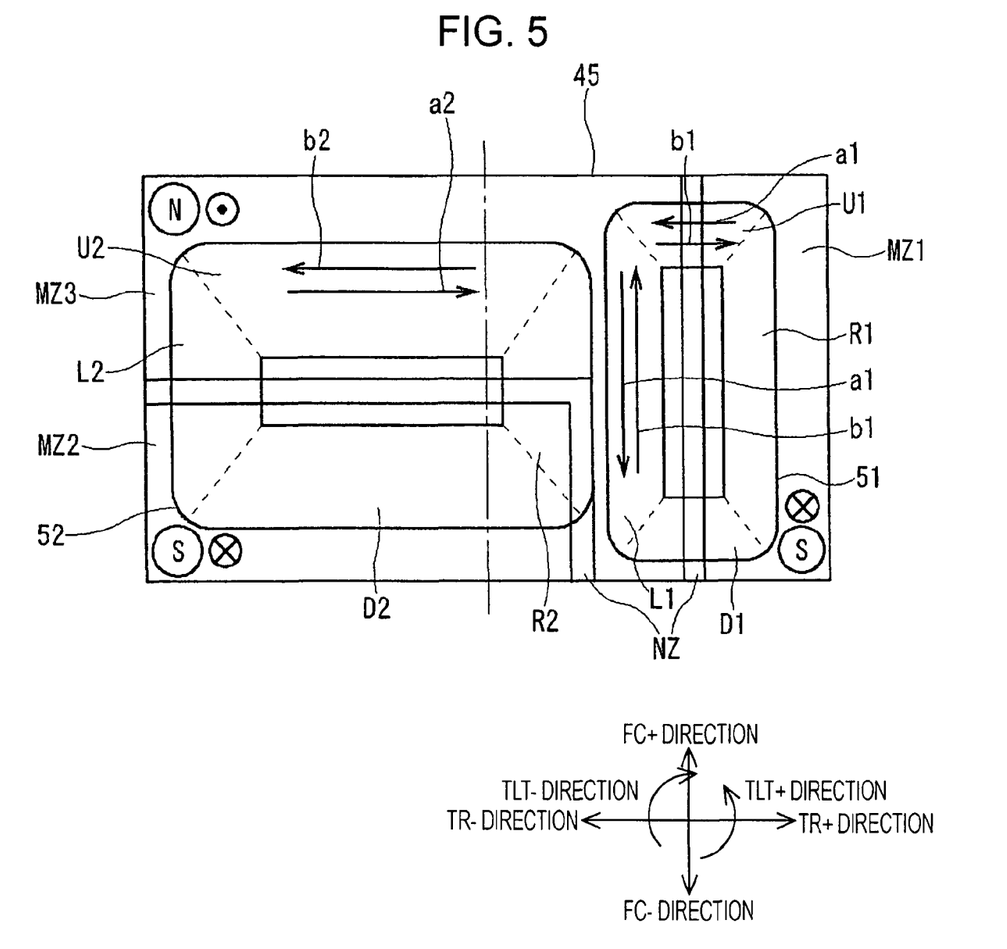
FIG. 5 is a schematic diagram illustrating an arrangement of the magnet and coils.

FIG. 5 illustrates an arrangement of the magnet 45 of FIG. 4 and the TR coil 51 and FC/TLT coil 52 of FIG. 3A. The magnet 45 is arranged such that the facing surface 45*a* (see FIG. 4) thereof faces the front surface 50*a* of the corresponding coil unit 50 (see FIG. 3A). Therefore, as illustrated in FIG. 5, a right part R1 of the TR coil 51 faces the S-pole in the first portion MZ1 of the magnet 45, while a left part L1 of the TR coil 51 faces the N-pole in the third portion MZ3 of the magnet 45. At the same time, an upper part U2 of the FC/TLT coil 52 faces the N-pole in the third portion MZ3 of the magnet 45, while a lower part D2 of the FC/TLT coil 52 faces the S-pole in the second portion MZ2 of the magnet 45.

Next, thrust to be generated when a current flows through each coil facing the magnet 45 will be described with reference to FIG. 5. Hereinafter, the direction of a current flowing downward through a part of the TR coil 51 facing the third portion MZ3, in other words, the direction of a current flowing inward from the upper side of the TR coil 51 is referred to as "forward direction a1", while the direction of a current flowing outward is referred to as "reverse direction b1". Also, hereinafter, the direction of a current flowing rightward through a part of the FC/TLT coil 52 facing the third portion MZ3, in other words, the direction of a current flowing inward through the upper side of the FC/TLT coil 52 is referred to as "forward direction a2", while the direction of a current flowing outward is referred to as "reverse direction b2".

The magnetic polarity of the magnet 45 is reversed at a position corresponding to a center of an upper part U1 and lower part D1 of the TR coil 51, the upper part U1 and lower part D1 being parallel to the tracking direction. Therefore, when a current flows through the TR coil 51 in the forward direction a1, thrust in opposite FC+ and FC− directions is generated in the upper part U1 and lower part D1 and thus, the thrust in these focusing directions is cancelled.

In the TR coil 51, at the same time, thrust in TR− direction (i.e., leftward thrust) is generated in the right part R1 facing the first portion MZ1 and parallel to the focusing direction, and thrust in TR− direction is also generated in the left part L1 that is opposite in current direction and magnetic polarity to the right part R1.

Likewise, when a current flows through the TR coil 51 in the reverse direction b1, thrust in TR+ direction (i.e., rightward thrust) is generated in the right part R1 and left part L1 of the TR coil 51 while thrust in the focusing directions is cancelled.

The magnetic polarity of the magnet 45 is also reversed at a position corresponding to a center of a left part L2 and right part R2 of the FC/TLT coil 52, the left part L2 and right part R2 being parallel to the focusing direction. Therefore, when a current flows through the FC/TLT coil 52 in the forward direction a2, thrust in opposite TR+ and TR− directions is generated in the left part L2 and right part R2 and thus, the thrust in these tracking directions is cancelled.

In the FC/TLT coil 52, at the same time, thrust in FC− direction (i.e., downward thrust) is generated in the upper part U2 facing the third portion MZ3 and parallel to the tracking direction, and thrust in FC− direction is also generated in the lower part D2 that is opposite in current direction and magnetic polarity to the upper part U2.

Likewise, when a current flows through the FC/TLT coil 52 in the reverse direction b2, thrust in FC+ direction (i.e., upward thrust) is generated in the upper part U2 and lower part D2 of the FC/TLT coil 52 while thrust in the tracking directions is cancelled.

In the actuator 40 (see FIG. 2), unlike a conventional actuator in which a focusing coil and a tilting coil are formed in different areas, two coils (focusing wiring 53 and tilting wiring 54 illustrated in FIG. 3A) which generate thrust in the same direction are formed in the same area. This makes it possible to form the FC/TLT coil 52 that is horizontally longer than before. Therefore, the ratio of the length of thrust-generating parts that are parallel with the tracking direction (hereinafter, this length will be referred to as "effective length") to the overall conductor length can be made greater than before. Thus, the amount of thrust generated when the same current flows, in other words, sensitivity of the actuator 40 per unit power can be higher than that of the conventional actuator.

Figure 6:
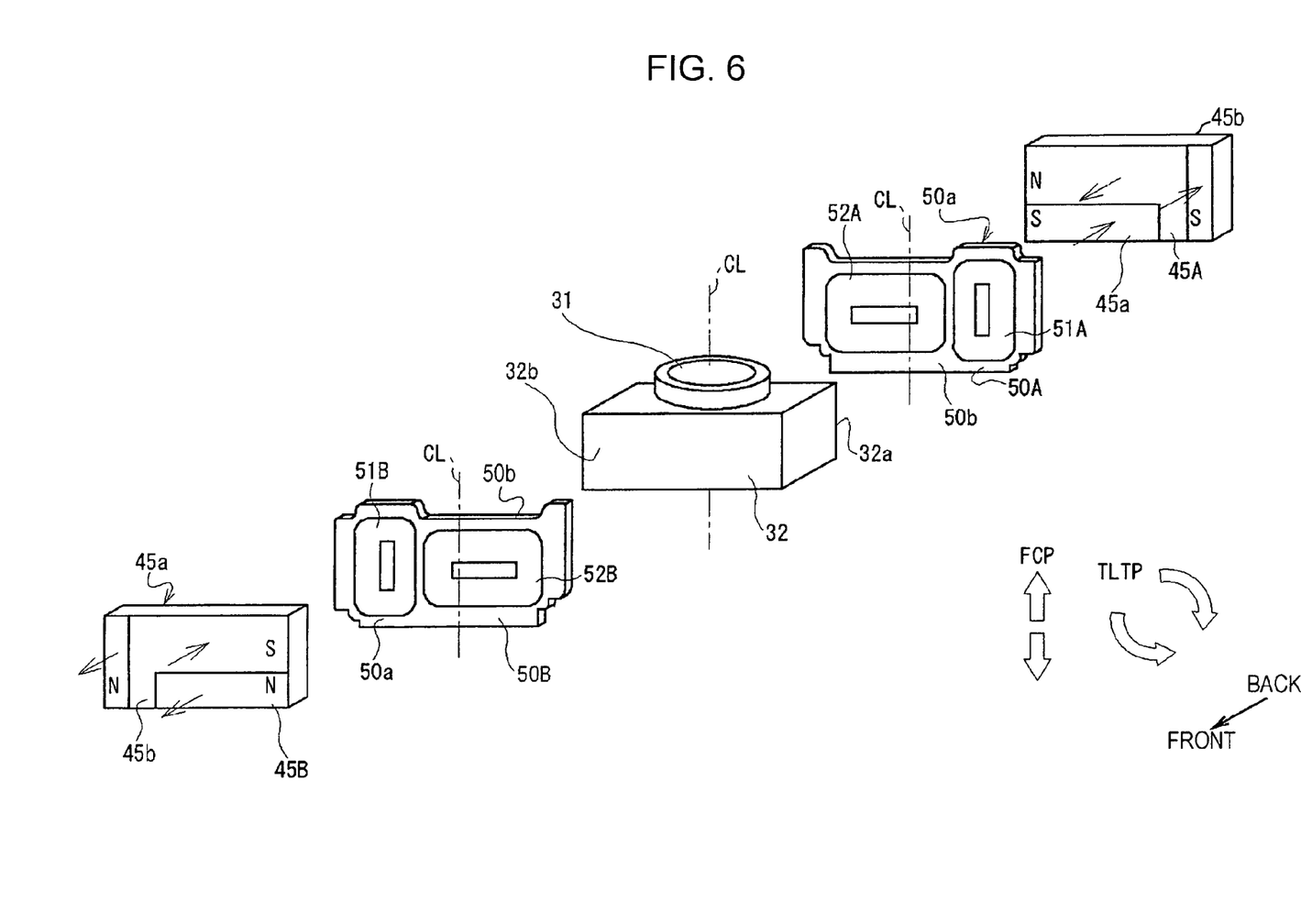
FIG. 6 is a schematic diagram illustrating an arrangement of magnets and coil units.

As illustrated in FIG. 6, in the actuator 40 (see FIG. 2), the first FC/TLT coil 52A and the second FC/TLT coil 52B which generate thrust in the focusing direction are arranged offset outwardly from a center line CL of the lens holder 32. Therefore, when thrust is simultaneously generated in the same direction, focusing thrust FCP which drives the lens holder 32 in the focusing direction is generated. Also, when thrust is simultaneously generated in opposite directions, tilting thrust TLTP which drives the lens holder 32 in the tilting direction is generated.

Specifically, in the actuator 40, the front surface 50a of the first coil unit 50A faces the facing surface 45a of the first magnet 45A. At the same time, the rear surface 50b of the first coil unit 50A is attached to the first surface 32a at the back of the lens holder 32 such that the rear surface 50b of the first coil unit 50A and the facing surface 45a of the first magnet 45A face toward the front.

Likewise, in the actuator 40, the front surface 50a of the second coil unit 50B faces the facing surface 45a of the second magnet 45B. At the same time, to allow the mounting surface 45b of the second magnet 45B and the front surface 50a of the second coil unit 50B to face toward the front, the second coil unit 50B and the second magnet 45B are flipped over or turned by 180 degrees about the center line CL of the second coil unit 50B, while the rear surface 50b at the back of the second coil unit 50B is attached to the second surface 32b at the front of the lens holder 32. As a result, the horizontal arrangement of the coils and magnetic poles in the second coil unit 50B and second magnet 45B is made opposite to that in the first magnet 45A and first coil unit 50A.

Then, two corresponding coils (i.e., the first TR coil 51A and second TR coil 51B, first focusing wiring 53A and second focusing wiring 53B, and first tilting wiring 54A and second tilting wiring 54B illustrated in FIGS. 7 and 8) are individually connected in series while being connected via the suspension wires 34 (see FIG. 2) to drive circuits, through which drive currents are supplied from the drive controller 13 (see FIG. 1).

The first focusing wiring 53A and the second focusing wiring 53B are connected such that currents flow in the same direction as viewed toward the center of the lens holder 32. On the other hand, the first TR coil 51A and the second TR coil 51B, and the first tilting wiring 54A and the second tilting wiring 54B are connected such that currents flow in opposite directions as viewed toward the center of the lens holder 32.

In other words, as illustrated in FIG. 7, when a current flows through the first TR coil 51A in the forward direction a1 in response to a supplied tracking drive current, a current flows through the second TR coil 51B in the reverse direction b1. This causes the first TR coil 51A to generate tracking thrust TRP directed toward the inside of the first coil unit 50A, while causing the second TR coil 51B to generate tracking thrust TRP directed toward the outside of the second TR coil 51B. Here, the horizontal arrangement of magnetic poles and the horizontal direction of current in the first coil unit 50A are opposite to those in the second coil unit 50B. Therefore, the first TR coil 51A and the second TR coil 51B generate tracking thrust TRP in the same direction, thereby driving the lens holder 32 in TR− direction.

On the other hand, when a current flows through the first focusing wiring 53A in the forward direction a2 in response to a supplied focusing drive current, a current flows through the second focusing wiring 53B also in the forward direction a2. Therefore, the first focusing wiring 53A and the second focusing wiring 53B generate the same downward focusing thrust FCP, thereby driving the lens holder 32 in FC− direction.

When a current flows through the first tilting wiring 54A in the forward direction a2 in response to a supplied tilting drive current, a current flows through the second tilting wiring 54B in the reverse direction b2. Therefore, the first tilting wiring 54A generates downward tilting thrust TLTP, while the second tilting wiring 54B generates upward tilting thrust TLTP. Since the first tilting wiring 54A and the second tilting wiring 54B are arranged offset outwardly from the center of the lens holder 32, they drive the lens holder 32 in TLT+ direction.

Also, as illustrated in FIG. 8, when a current flows through the first TR coil 51A in the reverse direction b1 in response to a supplied tracking drive current, a current flows through the second TR coil 51B in the forward direction a1. Therefore, the first TR coil 51A and the second TR coil 51B drive the lens holder 32 in TR+ direction.

On the other hand, when a current flows through the first focusing wiring 53A in the reverse direction b2 in response to a supplied focusing drive current, a current flows through the second focusing wiring 53B also in the reverse direction b2. Therefore, the first focusing wiring 53A and the second focusing wiring 53B drive the lens holder 32 in FC+ direction.

When a current flows through the first tilting wiring 54A in the reverse direction b2 in response to a supplied tilting drive current, a current flows through the second tilting wiring 54B in the forward direction a2. Therefore, the first tilting wiring 54A and the second tilting wiring 54B drive the lens holder 32 in TLT− direction.

Thus, the actuator 40 is configured to drive the lens holder 32, which is movably supported, in the three directions or in the tracking direction, focusing direction, and tilting direction.

(3) Actions and Effects

As illustrated in FIG. 3A, in the actuator 40 (see FIG. 2) with the configuration described above, the conductor of the focusing wiring 53 for driving the lens holder 32 in the focusing direction and the conductor of the tilting wiring 54 for driving the lens holder 32 in the tilting direction are concentrically wound together in parallel to form the FC/TLT coil 52.

Since in the actuator 40 the focusing wiring 53 and the tilting wiring 54 are formed in the same area as an apparently single coil or as the FC/TLT coil 52, the number of magnetized portions of the magnet 45 (see FIG. 4) is smaller than that in the case of a conventional actuator. Therefore, the actuator 40 can increase the degree of design freedom of the magnet 45, enhance the effective use of each magnetized portion of the magnet 45, and increase the effective length and the number of turns of each coil.

Also in the actuator 40, unlike a conventional actuator in which a focusing coil and a tilting coil are formed in different areas, thrust-generating parts of the FC/TLT coil 52 can be made longer without being separated by thrust-canceling parts (i.e., right part R2 and left part L2 illustrated in FIG. 5). Since this increases the effective length of the FC/TLT coil 52, the sensitivity of the actuator 40 per unit power is higher than that of the conventional actuator.

Additionally, the actuator 40 is configured such that the focusing wiring 53 and the tilting wiring 54 are wound together in parallel. Unlike in the case of a conventional actuator in which one coil is formed at the center of the other coil, since end portions of a conductor of one of the focusing wiring 53 and the tilting wiring 54 are not trapped in the other of the focusing wiring 53 and the tilting wiring 54, there is no limit to the connection of the end portions of the conductor.

Moreover, in the actuator 40, three coils corresponding to the three driving directions can be mounted on the coil unit 50 composed of a single substrate. Since this allows all conductors of the coils to face the magnet 45 in close proximity thereto, the actuator 40 having a high sensitivity per unit power can be realized.

If adjacent portions of the conductor of the TR coil 51 are short-circuited, the resulting change in the number of turns of the conductor causes only a slight change in tracking thrust TRP. However, in the FC/TLT coil 52, the conductors of the focusing wiring 53 and tilting wiring 54 are adjacent to each other. Therefore, if these conductors of the focusing wiring 53 and tilting wiring 54 are short-circuited, drive circuits of the two different coils are made electrically connected to each other, which may cause a serious problem.

However, the actuator 40 is configured such that the distance between the conductors of the focusing wiring 53 and tilting wiring 54 in the FC/TLT coil 52 is greater than the distance between adjacent portions of the conductor of the TR coil 51. This can reliably prevent the conductors in the FC/TLT coil 52 from being short-circuited and thus can reliably prevent an insulation failure between the focusing wiring 53 and the tilting wiring 54.

Also, unlike in the case of a conventional actuator in which a focusing coil and a tilting coil are formed as a single coil and connected to a dedicated drive circuit for driving in the focusing direction and tilting direction using a single drive current, the actuator 40 can be configured such that the focusing wiring 53 and tilting wiring 54 formed as an apparently single coil are connected to respective conventional drive circuits for driving using two drive currents. That is, the actuator 40 can achieve higher sensitivity per unit power while using conventional drive circuits.

Also, as illustrated in FIGS. 7 and 8, the actuator 40 (see FIG. 2) is configured such that the first FC/TLT coil 52A and the second FC/TLT coil 52B are arranged offset outwardly or in TR− direction or TR+ direction, respectively, from the center of the lens holder 32. At the same time, in the actuator 40, the first focusing wiring 53A and the second focusing wiring 53B are connected to their corresponding drive circuit such that currents flow in the first focusing wiring 53A and the second focusing wiring 53B in the same direction as viewed toward the center of the lens holder 32, while the first tilting wiring 54A and the second tilting wiring 54B are connected to their corresponding drive circuit such that currents flow in the first tilting wiring 54A and the second tilting wiring 54B in opposite directions as viewed toward the center of the lens holder 32. Thus, the actuator 40 can drive the lens holder 32 in two directions or in the focusing and tilting directions using the first FC/TLT coil 52A and the second FC/TLT coil 52B, each being apparently a single coil.

Also, in the actuator 40, the first TR coil 51A and the second TR coil 51B are connected in series and to their corresponding drive circuits such that currents flow in opposite directions in the first TR coil 51A and the second TR coil 51B as viewed toward the center of the lens holder 32. Therefore, the first magnet 45A and second magnet 45B with the same configuration can be used without varying the arrangement of magnetic poles.

As illustrated in FIG. 5, the magnet 45 is divided into three portions, or the first portion MZ1, second portion MZ2, and third portion MZ3, which are magnetized individually. The first portion MZ1 is created by dividing the magnet 45 in the tracking direction at a position corresponding to substantially the center of the TR coil 51 and faces the right half of the TR coil 51. The second portion MZ2 is created by dividing the magnet 45 in the focusing direction at a position corresponding to substantially the center of the FC/TLT coil 52 and faces the lower half of the FC/TLT coil 52. The third portion MZ3 faces the left half of the TR coil 51 and the upper half of the FC/TLT coil 52, and has a magnetic polarity opposite to that of the first portion MZ1 and second portion MZ2.

Since the number of magnetized portions is as small as three, the area of the magnet 45 can be effectively used, as the area of neutral portions NZ is small.

As described above, the actuator 40 of the optical pickup 20 is configured such that the focusing wiring 53 and the tilting wiring 54 are concentrically wound together in parallel to form the FC/TLT coil 52 (see FIG. 3A). Therefore, the number of magnetized portions of the magnet 45 can be made small and thus, the actuator 40 can provide high sensitivity per unit power.

(4) Other Embodiments

The present invention is not limited to the above-described embodiment where coils for three driving directions are formed as the coil unit 50. It is possible that coils for three driving directions are formed as a wound core coil by winding conductors around a core, or as a laminated coil by stacking three or more wound coils.

Also, the present invention is not limited to the above-described embodiment where the magnet 45 is divided into three portions, or the first portion MZ1, second portion MZ2, and third portion MZ3, which are magnetized individually. The magnet 45 may be divided into any number of portions of any shape, and then magnetized.

The present invention is not limited to the above-described embodiment where the TR coil 51 and the FC/TLT coil 52 including the focusing wiring 53 and tilting wiring 54 combine together to form the coil unit 50. The number of coils and combinations thereof may be changed as appropriate. For example, the TR coil 51 disposed in the middle, the FC/TLT coil 52 outside the TR coil 51, and a focusing coil inside the TR coil 51 may combine to form a coil unit, thereby preventing skew in a radial direction from occurring during driving in the focusing direction.

Also, the present invention is not limited to the above-described embodiment where the distance between the conductors in the FC/TLT coil 52 is greater than that between adjacent portions of the conductor in the TR coil 51. The distance between conductors may be changed as appropriate according to the number and shape of the conductors.

The present invention is not limited to the above-described embodiment where the optical pickup 20 includes the lens holder 32, suspension wires 34 (serving as elastic support members), TR coils 51, focusing wirings 53 (serving as focusing coils), tilting wirings 54 (serving as tilting coils), and magnets 45. An optical pickup according to an embodiment of the present invention may include a lens holder, elastic support members, tracking coils, focusing coils, tilting coils, and magnets that are configured in various ways.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a lens holder that holds an objective lens for converging a light beam on a signal recording layer of an optical disk;
elastic support members that support the lens holder such that the lens holder can freely move in three driving directions, the three driving directions comprising a tracking direction, a focusing direction, and a tilting direction;
a pair of coil units attached to two sides of the lens holder, the two sides being spaced in a tangential direction orthogonal to the focusing direction and tracking direction; and
a pair of magnets arranged to face the corresponding coil units,
wherein each of the pair of coil units comprises a tracking coil, a focusing coil, and a tilting coil for driving the lens holder in the three driving directions;
wherein each of the pair of coil units is configured such that a distance between the focusing conductor and the tilting conductor is greater than a distance between adjacent portions of a tracking conductor forming the tracking coil; and
the focusing coil and the tilting coil are formed by winding a focusing conductor of the focusing coil and a tilting conductor of the tilting coil together in parallel.

2. The optical pickup according to claim 1, wherein the focusing coil and tilting coil included in one of the pair of coil units are arranged offset from a center of the lens holder in one direction parallel to the tracking direction; and
the focusing coil and tilting coil included in the other of the pair of coil units are arranged offset from the center of the lens holder in the other direction parallel to the tracking direction.

3. The optical pickup according to claim 1, wherein each of the pair of coil units is made by forming conductors on a single flat substrate.

4. The optical pickup according to claim 1, wherein the pair of coil units are configured such that, when predetermined drive currents are supplied and when viewed toward a center of the lens holder, currents flow in the same direction in the two focusing coils in the pair of coil units, while currents flow in opposite directions in the two tracking coils in the pair of coil units and also in the two tilting coils in the pair of coil units.

5. The optical pickup according to claim 1, wherein each of the pair of magnets includes a first portion created by dividing the magnet in the tracking direction at a position corresponding to substantially a center of the opposite tracking coil and facing one half of the tracking coil, a second portion created by dividing the magnet in the focusing direction at a position corresponding to substantially a center of the opposite focusing coil and tilting coil and facing one half of the focusing coil and tilting coil, and a third portion facing the other half of the tracking coil and the other half of the focusing coil and tilting coil and having a magnetic polarity opposite to that of the first portion and second portion.

6. An optical disk apparatus comprising:
a lens holder that holds an objective lens for converging a light beam on a signal recording layer of an optical disk;
elastic support members that support the lens holder such that the lens holder can freely move in three driving directions, the three driving directions comprising a tracking direction, a focusing direction, and a tilting direction;
a pair of coil units attached to two sides of the lens holder, the two sides being spaced in a tangential direction orthogonal to the focusing direction and tracking direction;
a pair of magnets arranged to face the corresponding coil units;
wherein each of the pair of coil units is configured such that a distance between the focusing conductor and the tilting conductor is greater than a distance between adjacent portions of a tracking conductor forming the tracking coil; and
a drive controller that supplies drive currents to the pair of coil units,
wherein each of the pair of coil units includes a tracking coil, a focusing coil, and a tilting coil for driving the lens holder in the three driving directions; and
the focusing coil and the tilting coil are formed by winding a focusing conductor of the focusing coil and a tilting conductor of the tilting coil together in parallel.

* * * * *